Feb. 21, 1928.

J. L. AVERY.

DIRECT READING COMPENSATED SCALE CALIPERS

Filed Feb. 24. 1925

1,659,939

INVENTOR
JOHN L. AVERY
BY
ATTORNEY

Patented Feb. 21, 1928.

1,659,939

UNITED STATES PATENT OFFICE.

JOHN L. AVERY, OF GARDENA, CALIFORNIA.

DIRECT-READING COMPENSATED-SCALE CALIPERS.

Application filed February 24, 1925. Serial No. 11,149.

This invention relates to measuring instruments, and has for its principal object to provide an improved instrument for taking internal and external measurements of length or distance between points. These points may be situated in depressions, and thus make necessary the moving of the legs of a pair of calipers, destroying the setting which has been made, in order to remove the calipers from the object being measured. My novel device provides for a direct reading of the actual rectilinear distance between points, and makes it possible to take measurements within depressions with accuracy and facility. Upon the mere reversing of a caliper leg, as will hereinafter be described, this invention is adapted to the taking of either inside or outside measurements.

Special advantages of the invention and further objects thereof, including the use of a novel foolproof compensated scale in conjunction with caliper points of a preferred configuration, will be made evident hereinafter.

Referring to the drawing, which is for illustrative purposes only,

Figures 1, 2, 3, 4, 5, 6, 7:
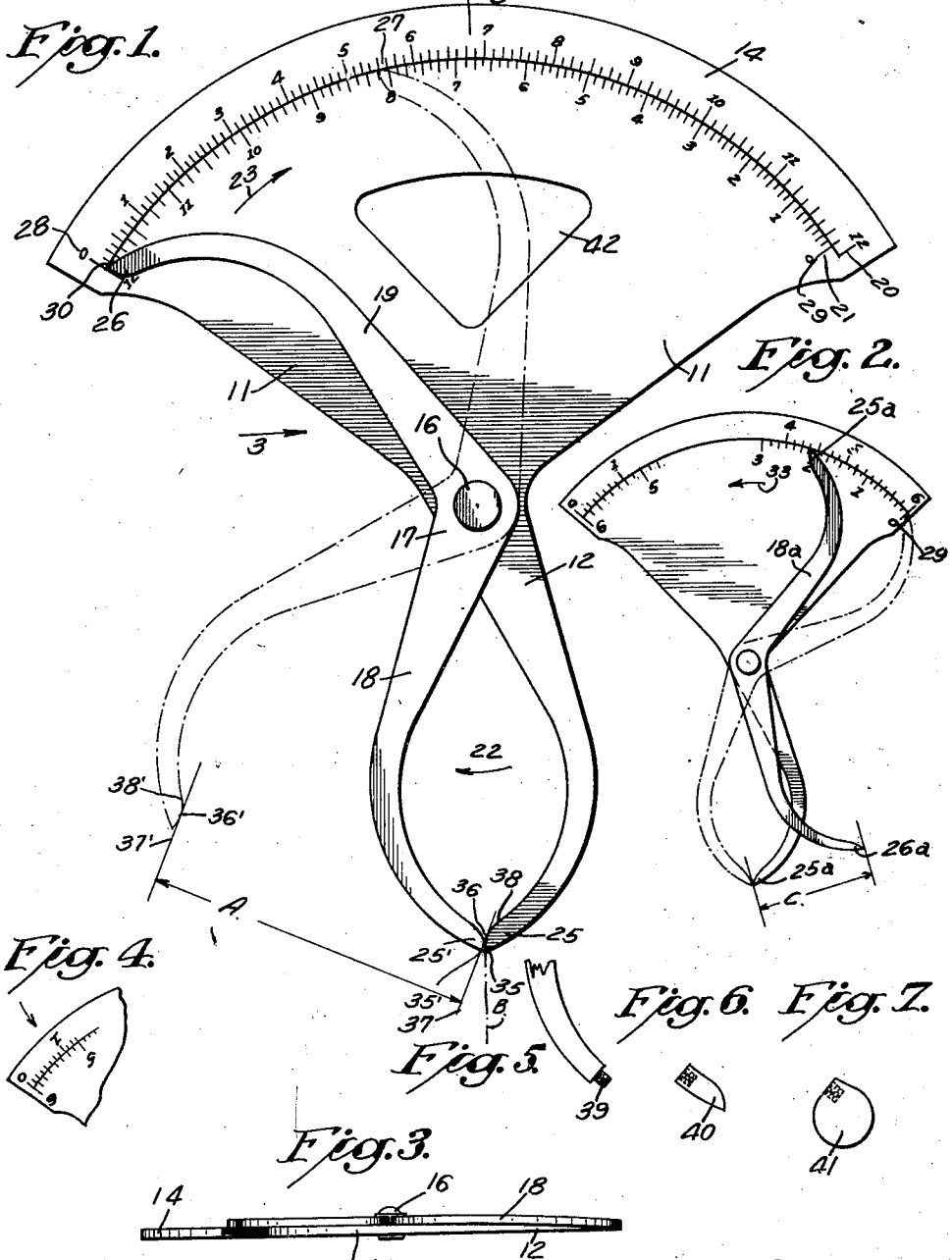
Fig. 1 is a face view of my device as it is employed for outside calipering.
Fig. 2 is a face view showing, on a reduced scale, a device similar in many respects but of smaller size and arranged for inside calipering.
Fig. 3 is an edge view on a reduced scale of the device as shown in Fig. 1, this view being taken as indicated by the arrow 3.
Fig. 4 is a fragmentary view showing the manner in which it is desirable to place the scale numerals on calipers employed for certain classes of work.

Figs. 5, 6 and 7 relate to a replaceable tip construction hereinafter referred to.

As shown in the drawing, I provide a primary member 11 comprising a primary caliper leg 12 and a dial plate 14. The member 11 is preferably stamped from sheet steel in substantially flat form, so that the dial plate 14 and the caliper leg 12 will extend in a continuous plane. At a point where the dial plate 14 and the primary leg 12 join, a secondary member 17 may be pivoted, as by means of a rivet or clamping screw 16, as desired. The secondary member 17 comprises a pair of legs 18 and 19, which are adapted to serve alternatively as pointers, being of equal length and preferably formed symmetrical with the leg 12; but instead of being placed directly upon a diametral axis extending through the pivot 16, the legs 18 and 19 are placed at an angle to one another, as shown, this angle being governed by the length of the arc through which the graduated outside and inside scales 20 and 21 upon the dial plate 14 extend.

With reference to Fig. 1, it will be perceived that as the leg 18 is moved relatively to the leg 12, in a direction indicated by the arrow 22, the leg 19 will rotate in the direction indicated by the arrow 23. Thus when the tips 25, 25', of the caliper legs 12 and 18 have been spread apart exactly to engage the sides of a body having an outside diameter such as is indicated by the line A, the point 26 of the leg 19 will have moved into the position indicated at 27, which may be at a distance away from the zero point of the outside scale 20 equal to the distance A. By suitably graduating the scales 20 and 21, it is possible to read directly therefrom any distances that the points of the legs 12 and 18 may be spaced apart.

For the respective purposes of exterior and interior calipers, it is necessary to calibrate the graduations 20 and 21 to read from opposite ends, as from zeros indicated at 28 and 29, preferably placing these calibrations respectively above and below a dividing line or lines 30. The arc or arcs through which the mentioned graduations extend may project about equally upon opposite sides of the central axis B—B of the primary member 11, so that when, for inside calipering, the secondary member 17 is swung through substantially a half revolution from the position in which it is shown in Fig. 1, and the tip 26 of the arm 19 is brought adjacent to the tip 25 of the arm 12, the point of the tip 25' of the arm 18 will coincide with the zero point 29 of the interior reading scale 21.

From a comparison of Figs. 1 and 2, it will be perceived that, for outside measuring, the arm 19 moves across the scale from left to right, as indicated by the arrow 23, while for inside measurements the leg 18 must move upon the scale from right to left as indicated by the arrow 33 in Fig. 2. Any spread between the tips 25 and 26 of the arms 12 and 19, (or any spread between the tips 25ª and 26ª such as a spread of the distance C, Fig. 2) will be represented upon the scale 29 (or 29') in the spacing of the end 25 (or 25ª) of the arm 18 (or 18ª) from the zero point of the "inside" scale. My device thus employs but a single dial plate, upon which both interior and exterior graduations are inscribed; and the mechanically interconnected legs which adapt my calipers to alternative use in interior and exterior measuring move upon this single plate in indicating all caliper readings.

For certain uses of my calipers, it may be desirable to reverse the scale graduations as indicated in Fig. 4, so that they may be more conveniently read from the direction indicated by the arrow 34. This, however, is merely a matter of design, and does not affect the principles of the invention.

An advantageous feature of this invention is the fact that my novel calipers may be easily kept in accurate reading adjustment regardless of wear and regrinding of tips. It will be perceived that, owing to the curvature of the leg 19, the tip 26 thereof approaches the scale graduations 20 at a considerable angle relative to a radial line extending across the point 26. Therefore, as the tips 25 and 25' of the legs 12 and 18 become worn from wear, allowing the legs to swing closer together, the face of the end 26 may be ground off correspondingly, to coincide with the zero reading 28 on the scale 20, when the points 25, 25' are together, the special tip forms shown and hereinafter described being however preferably preserved.

Although for certain delicate and precise requirements, I may prefer to provide the respective legs of my combination calipers with comparatively sharp tips, substantially as indicated in Fig. 2, in which case the "outside" scale 20$^a$ and the "inside" scale 21$^a$ may be of equal length; for ordinary machine shop and other uses I prefer to provide the legs of my calipers with more rugged tips, and to provide the dial 14 with an outside scale "compensated" for use therewith substantially as shown in Fig. 1.

In the form of my invention last referred to, the inner surfaces of the tips 25, 25' may be so rounded that, although the extreme points 35, 35' represent lines of tangency when the calipers are closed, these points are incapable of external contact with the parallel faces of any object having an appreciable diameter. For example, not the points nor lines 35, 35', but points or lines 36, 36' on the curved inner surfaces of the respective tips 25, 25' may be adapted to contact with the parallel outer surfaces 37, 37' of an object having the diameter A; and, in an instrument of the character illustrated in Fig. 1, having a capacity up to 12 inches, when the points or lines 38, 38', making contact with a large object, are spaced 12 inches apart, the extreme points 35, 35' may be 12$\frac{3}{16}$ inches apart. To compensate for the variations just mentioned and to render my instrument not only direct reading but fool proof, I may accordingly expand the outside scale so that the actual distance between "0" and "12" to which the tip 26 may be brought, may be 12$\frac{3}{16}$ inches. By giving the inner or work-engaging surfaces of the tips 25, 25' a suitable curvature, substantially as shown, the compensatory adaptation of the scale 20 may be uniformly distributed throughout the length thereof; and, in the case assumed, a so-called "$\frac{3}{16}$ inch shrink rule" may advantageously be employed in laying out, on the arcuate curved line 30, by drawing chords from the zero 28, all required points of the outside scale 20. The tip 26 may advantageously have the same configuration as the tips 25, 25'; but, since the tips 25 and 26, when these are used in taking inside measurements, may always make contacts at their extreme points, the special precautions above referred to are not required in laying out the "inside" scale 21. The outside scale 20 is accordingly shown as overrunning the inside scale 21 at the zero end of the latter; and the extent of this overrunning, as well as the distribution of the difference throughout the length of the outside scale, must obviously depend upon the exact configuration given to the meeting tips. The latter may, for example, be so fashioned as to justify the employment of a $\frac{1}{8}$ inch or a $\frac{1}{4}$ inch shrink rule in laying out my outside scale.

Although I prefer to make my calipers of so tough a steel that wear may be negligible, I may optionally provide the same with replaceable tips. For example, as shown in Figs. 6, 7 and 8, I may provide threaded pins 39 integral with the respective legs and adapted to retain tips 40 of any preferred configuration; but, even when I employ tips 41 of a rounded form, such as may especially be suitable for use by physicians and anthropometrists in taking measurements of the human head or body, I prefer to preserve substantially those standard curvatures of tip profile with reference to which my caliper scale or scales may originally have been graduated. I do not consider it ordinarily advantageous to give the main member 11 a folding or collapsible construction, as such constructions are generally unfavorable both to durability and to rigidity; but I may optionally reduce weight of cutting an aperture or apertures 42 from the center of the triangular plate of the member 11, or its equivalent.

From the foregoing description and the accompanying illustrations, it will be understood that the primary leg 12 serves in both inside and outside calipering operations. The construction of the calipers is such that they are suitable for both inside and outside measurements, and settings of the legs may be read directly upon the respective scales. Optionally, the tips of the respective legs may be given a rugged and wear-resistant special configuration; and, the respective scales may be laid out in exact adaptation thereto. But it should be understood that various features of my invention may be independently used, and also that various modifications may be made, by those skilled in the art to which this case relates, without the slightest departure from the spirit and scope of my invention, as the same is indicated above and in the following claims.

I claim as my invention:

1. Calipers including: a primary caliper member integral with a leg; and a secondary and V-shaped caliper member pivoted thereto and comprising legs which have curved tips, said tips being adapted to serve alternatively as pointers cooperating with scales on said primary caliper member, and one of the mentioned scales being expanded to compensate for the curvatures of said tips.

2. A caliper provided with curved tips having points and with a plurality of scales, one of said scales being adapted to cooperate with said points, the other of said scales being expanded to compensate for the curvatures of said tips.

3. A caliper provided with a scale and with replaceable tips, one of said tips being pointed and another rounded, each of said tips having a curvature rendering it suitable for optional use with said scale.

4. A caliper provided with two scales and with legs having curved tips terminating in points, one of said scales being adapted to cooperate with said points, and the other of said scales being expanded consistently with the curvature of said tips.

In testimony whereof, I have hereunto set my hand at Los Angeles, California, this 13th day of February, 1925.

JOHN L. AVERY.